United States Patent
Haverinen et al.

(10) Patent No.: US 10,056,961 B1
(45) Date of Patent: Aug. 21, 2018

(54) PERFORMANCE OF SHORT-RANGE WIRELESS NETWORK CHANNEL SCANS USING RECEIVER DIVERSITY

(71) Applicant: QUALCOMM Incorporated, San Diego, CA (US)

(72) Inventors: Anssi Haverinen, San Diego, CA (US); Le Luong, San Diego, CA (US); Yoshiro Fukuoka, Solana Beach, CA (US); Paul Denboer, Escondido, CA (US); Huibert Denboer, Escondido, CA (US); Joel Linsky, San Diego, CA (US); Thomas Cargill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/640,403

(22) Filed: Jun. 30, 2017

(51) Int. Cl.
*H03K 9/00* (2006.01)
*H04B 7/08* (2006.01)
*H04W 4/00* (2018.01)
*H04W 4/80* (2018.01)
*H04W 24/08* (2009.01)

(52) U.S. Cl.
CPC .......... *H04B 7/0802* (2013.01); *H04W 4/008* (2013.01); *H04W 4/80* (2018.02); *H04W 24/08* (2013.01)

(58) Field of Classification Search
CPC ..... H04W 4/008; H04W 4/027; H04W 28/18; H04W 48/18; H04W 36/0066; H04W 76/025; H04W 88/10; H04W 74/04; H04W 84/005; H04W 88/12; H04B 7/02; H04B 2201/71346; H04B 7/0413; H04M 1/7253; Y02D 70/00; Y02D 70/142; Y02D 70/144; Y02D 70/22; Y02D 70/162; Y02D 70/164; Y02D 70/1264; Y02D 70/12; Y02D 70/122; Y02D 70/124; Y02D 70/20; Y02D 70/16; Y02D 70/442

See application file for complete search history.

(56) References Cited

U.S. PATENT DOCUMENTS

| 8,311,509 | B2 | 11/2012 | Feher |
| 8,682,317 | B2 | 3/2014 | Pinder |
| 9,497,652 | B2 | 11/2016 | Mujtaba et al. |
| 9,648,556 | B2 | 5/2017 | Odio et al. |
| 2006/0009216 | A1 | 1/2006 | Welnick et al. |
| 2017/0280399 | A1* | 9/2017 | Chrisikos ............ H04W 52/243 |

* cited by examiner

*Primary Examiner* — Rahel Guarino
(74) *Attorney, Agent, or Firm* — Muncy, Geissler, Olds & Lowe, P.C./Qualcomm

(57) ABSTRACT

Disclosed are techniques for improving performance of short-range wireless network channel scans using receiver diversity. In an aspect, an electronic device having two or more short-range wireless network receiver antennas determines whether to utilize different receiver antennas of the two or more short-range wireless network receiver antennas to perform concurrently scheduled channel scans for different short-range wireless network radio access technologies (RATs) supported by the electronic device, or to perform an accelerated channel scan for a single short-range wireless network RAT of the different short-range wireless network RATs supported by the electronic device, and performs the concurrently scheduled channel scans or the accelerated channel scan based on the determination.

30 Claims, 6 Drawing Sheets

PERFORMANCE OF SHORT-RANGE WIRELESS NETWORK CHANNEL SCANS USING RECEIVER DIVERSITY

Aspects of this disclosure relate generally to radio communications, and more particularly to improving the performance of short-range wireless network channel scans using receiver diversity and the like.

A diversity scheme is a method for improving the reliability of a wireless message signal by using two or more communication channels with different characteristics. Diversity is a common technique for reducing fading and co-channel interference, and thereby increasing the receiving device's sensitivity to wireless signals. It is based on the fact that individual channels experience different levels of fading and interference. Multiple versions of the same signal may be transmitted and/or received and combined in the receiver.

One type of diversity is spatial diversity, where a signal is transmitted over multiple different propagation paths. In the case of wireless transmission, it can be achieved by antenna diversity, i.e., using multiple transmitter antennas (transmit diversity) and/or multiple receiver antennas (receiver diversity). In the latter case, a diversity combining technique is applied before further signal processing takes place. If the antennas are at a distance in the order of one wavelength (e.g., multiple antennas in a single device), it is referred to as microdiversity.

A wireless personal area network (WPAN) is a computer network used for data transmission amongst wireless devices such as cellular telephones, laptop computers, tablet computers, personal digital assistants (PDAs), and the like. WPANs can be used for communication amongst the personal devices themselves (interpersonal communication), or for connecting to a higher level network and the Internet (an uplink) where one "master" device acts as an internet router. A WPAN typically utilizes a short-range wireless network protocol such as Bluetooth® (e.g., Bluetooth® Low Energy (BLE), Bluetooth® Long Range (BLR), Bluetooth® Classic), ZigBee®, Wireless USB, Z-Wave®, IEEE 802.15.4 (15.4), Long-Term Evolution Direct (LTE-D), and the like.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for improving performance of short-range wireless network channel scans using receiver diversity includes determining, by an electronic device having two or more short-range wireless network receiver antennas, whether to utilize different receiver antennas of the two or more short-range wireless network receiver antennas to perform concurrently scheduled channel scans for different short-range wireless network radio access technologies (RATs) supported by the electronic device, or to perform an accelerated channel scan for a single short-range wireless network RAT of the different short-range wireless network RATs supported by the electronic device, and performing, by the electronic device, the concurrently scheduled channel scans or the accelerated channel scan based on the determination.

In an aspect, an apparatus for improving performance of short-range wireless network channel scans using receiver diversity includes two or more short-range wireless network receiver antennas and a communication controller coupled to the two or more short-range wireless network receiver antennas, the communication controller configured to: determine whether to utilize different receiver antennas of the two or more short-range wireless network receiver antennas to perform concurrently scheduled channel scans for different short-range wireless network RATs supported by the apparatus, or to perform an accelerated channel scan for a single short-range wireless network RAT of the different short-range wireless network RATs supported by the apparatus, and cause a communication device of the apparatus to perform the concurrently scheduled channel scans or the accelerated channel scan based on the determination.

In an aspect, an apparatus for improving performance of short-range wireless network channel scans using receiver diversity includes two or more short-range wireless network receiver antennas, means for determining whether to utilize different receiver antennas of the two or more short-range wireless network receiver antennas to perform concurrently scheduled channel scans for different short-range wireless network RATs supported by the apparatus, or to perform an accelerated channel scan for a single short-range wireless network RAT of the different short-range wireless network RATs supported by the apparatus, and means for performing the concurrently scheduled channel scans or the accelerated channel scan based on the determination.

In an aspect, a non-transitory computer-readable medium storing computer-executable instructions for improving performance of short-range wireless network channel scans using receiver diversity includes computer-executable instructions comprising at least one instruction instructing an electronic device having two or more short-range wireless network receiver antennas to determine whether to utilize different receiver antennas of the two or more short-range wireless network receiver antennas to perform concurrently scheduled channel scans for different short-range wireless network RATs supported by the electronic device, or to perform an accelerated channel scan for a single short-range wireless network RAT of the different short-range wireless network RATs supported by the electronic device, and at least one instruction instructing the electronic device to perform the concurrently scheduled channel scans or the accelerated channel scan based on the determination.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Disclosed are techniques for improving performance of short-range wireless network channel scans using receiver diversity. In an aspect, an electronic device having two or more short-range wireless network receiver antennas determines whether to utilize different receiver antennas of the two or more short-range wireless network receiver antennas to perform concurrently scheduled channel scans for different short-range wireless network radio access technologies (RATs) supported by the electronic device, or to perform an accelerated channel scan for a single short-range wireless network RAT of the different short-range wireless network RATs supported by the electronic device, and performs the concurrently scheduled channel scans or the accelerated channel scan based on the determination.

These and other aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
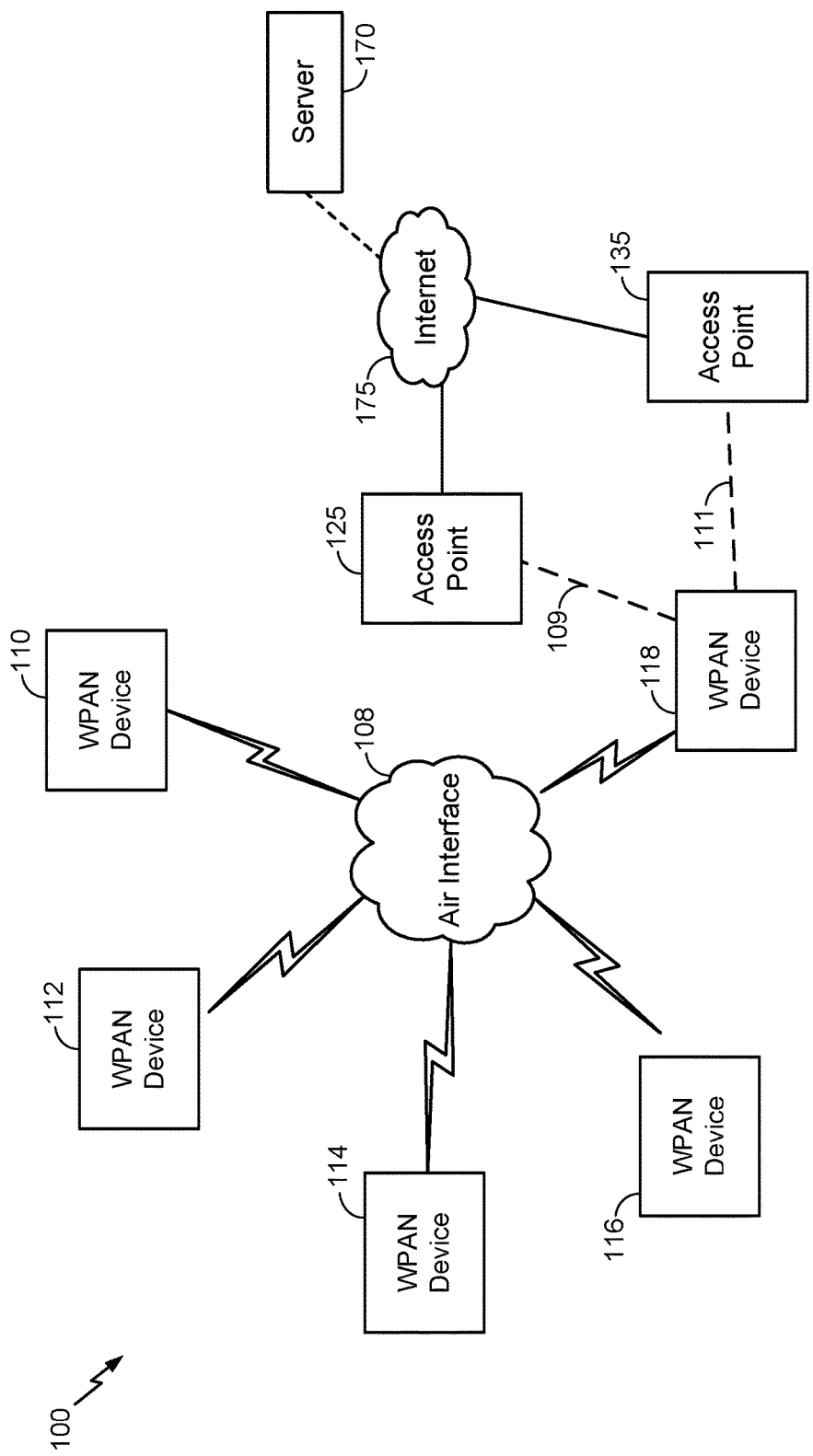
FIG. 1 illustrates an exemplary system architecture of a wireless communications system in accordance with various aspects of the disclosure.

FIG. 1 illustrates an exemplary system architecture of a wireless communications system 100 in accordance with various aspects of the disclosure. The wireless communications system 100 contains a plurality of wireless communication devices 110 to 118 forming a WPAN, and therefore referred to as "WPAN devices." WPANs, such as that comprising WPAN devices 110 to 118, can be used for communication amongst the WPAN devices 110 to 118 themselves (referred to as "interpersonal communication"), or for enabling the WPAN devices 110 to 118 to connect to a higher level network (e.g., the Internet 175) where one "master" WPAN device (e.g., WPAN device 118) acts as a router for the other WPAN devices.

The WPAN devices 110 to 118 are configured to communicate with each other over a physical communications interface or layer, shown in FIG. 1 as air interface 108. The air interface 108 can comply with a short-range wireless communications protocol, such as Bluetooth® Low Energy (BLE), Bluetooth® Long Range (BLR), Bluetooth® Classic, ZigBee®, Wireless USB, Z-Wave®, IEEE 802.15.4 (15.4), and the like. The WPAN devices 110 to 118 can use the air interface 108 for "interpersonal communications" among themselves.

In the example of FIG. 1, the WPAN device 118 may optionally, but not necessarily, be configured to communicate with one or more access networks (e.g., access point 125 and/or access point 135) over wired or wireless connections 109 and 111. If so connected, the WPAN 118 can access the Internet 175 via the access point 125 and/or the access point 135. The WPAN 118 may communicate with the access point 125 and/or the access point 135 using standard Internet protocols (e.g., Transmission Control Protocol (TCP) and Internet Protocol (IP)). The access point 125 and/or the access point 135 may be connected to the Internet 175 via, for example, an optical communication system, such as FiOS, a cable modem, a digital subscriber line (DSL) modem, or the like. The access point 125 may be, for example, a macro cell base station providing cellular coverage to the WPAN device 118 in the licensed spectrum, such as an eNode B in Long-Term Evolution (LTE), while the access point 135 may be a small cell base station, such as a femto cell providing cellular coverage to the WPAN 118 in unlicensed spectrum, or a wireless local area network (WLAN) access point, such as a WiFi access point providing Internet access to the WPAN 118 in unlicensed spectrum.

In an aspect, the WPAN 118 may optionally act as a router for communications between any of the remaining WPAN devices 110 to 116 and the Internet 175 via the access point 125 and/or the access point 135. However, this is not necessary, and each of WPAN devices 110 to 118 may be capable of communicating with the access point 125 and/or the access point 135 directly, a different access point entirely, or no access points. In an aspect, there may be other WPAN devices or no devices in place of one or more of the access points 125 and 135, and the WPAN devices 110 to 118 may communicate only among themselves and without a connection to a larger network (e.g., the Internet 175).

The WPAN 118 may optionally communicate with a server 170 over the Internet 175. The server 170 can be implemented as a plurality of structurally separate servers, or alternately may correspond to a single server. In various aspects, the server 170 may be optional (as indicated by the dotted line). The server 170 may provide various services to the WPAN device 118, and in turn to the remainder of the WPAN devices 110 to 116 where the WPAN device 118 acts as a router for WPAN devices 110 to 116.

Figure 2:
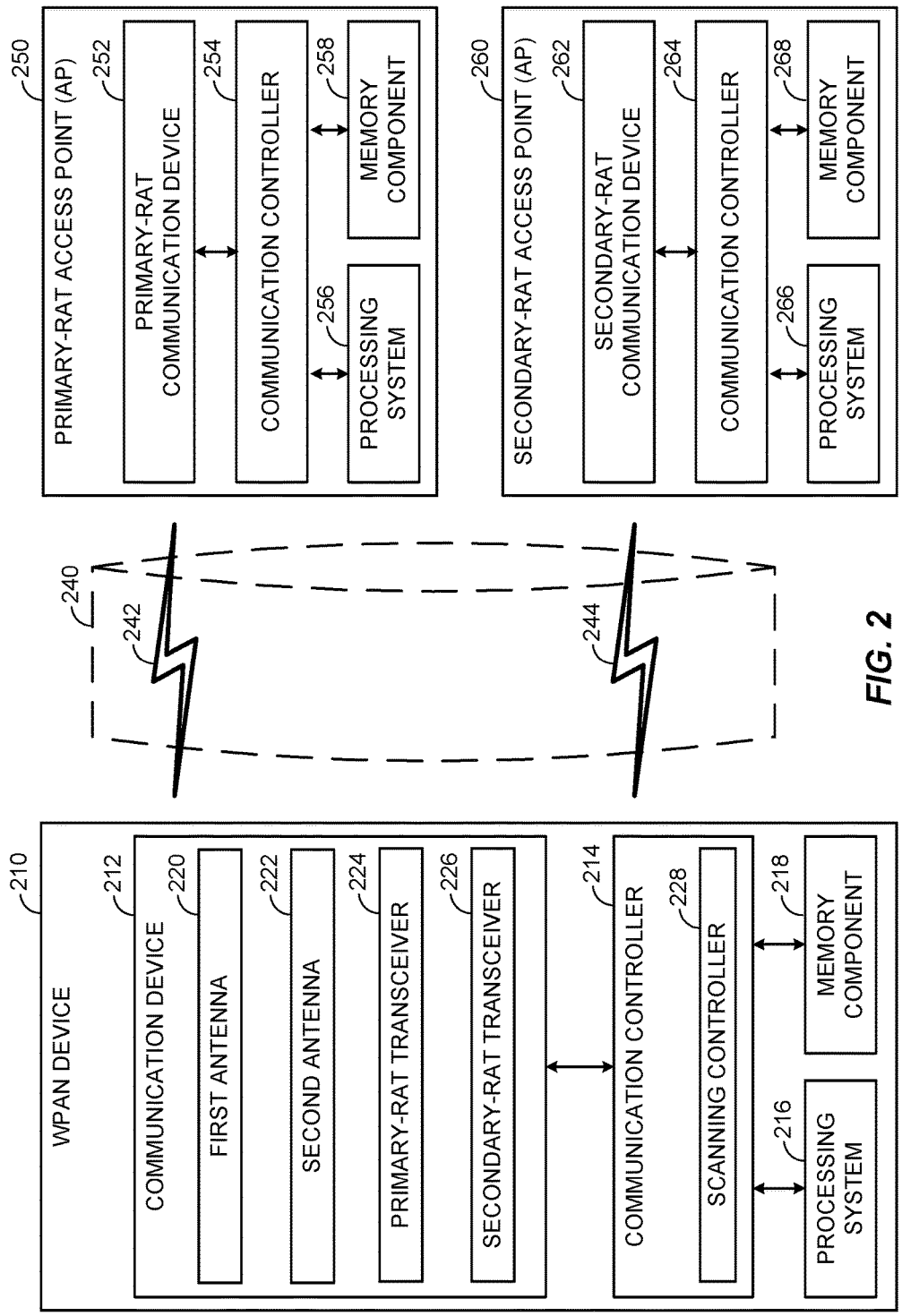
FIG. 2 illustrates an example wireless communication system including a WPAN device in communication with two wireless communication devices.

FIG. 2 illustrates an example wireless communication system including a dual-mode WPAN device 210 in communication with two wireless communication devices 250 and 260 according to at least one aspect of the disclosure. The WPAN device 210 may correspond to any of WPAN devices 110 to 118 in FIG. 1, and the wireless communication devices 250 and 260 may correspond to any other of the WPAN devices 110 to 118, the access points 125 and 135, or a combination of one of WPAN devices 110 to 118 and one of the access points 125 and 135 in FIG. 1. Unless otherwise noted, the terms "WPAN device" and "wireless communication device" are not intended to be specific or limited to any particular RAT. In general, WPAN devices may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as an Access Terminal (AT), a User Device (UD), a Mobile Station (MS), a Subscriber Station (STA), a User Equipment (UE), etc. Similarly, an access point (where one or both of wireless communication devices 250 and 260 correspond to an access point) may operate according to one or several RATs in communicating with WPAN devices depending on the network in which the access point is deployed, and may be alternatively referred to as a Base Station (BS), a Network Node, a NodeB, an evolved NodeB (eNode B or eNB), etc.

In the example of FIG. 2, the WPAN device 210 is in communication with a first wireless communication device 250 and a second wireless communication device 260. The WPAN device 210 and the wireless communication devices 250 and 260 each generally include a communication device (represented by the communication devices 212, 252, and 262) for communicating with other network nodes via at least one designated RAT. The communication devices 212, 252, and 262 may be variously configured for transmitting and encoding signals (e.g., messages, indications, information, and so on), and, conversely, for receiving and decoding signals (e.g., messages, indications, information, pilots, and so on) in accordance with the designated RAT. The WPAN device 210 and the wireless communication devices 250 and 260 may also each generally include a communication controller (represented by the communication controllers 214, 254, and 264) for controlling operation of their respective communication devices 212, 252, and 262 (e.g., directing, modifying, enabling, disabling, etc.). The communication controllers 214, 254, and 264 may operate at the direction of or otherwise in conjunction with respective host system functionality (illustrated as the processing systems 216, 256, and 266 and the memory components 218, 258, and 268). In some designs, the communication controllers 214, 254, and 264 may be partly or wholly subsumed by the respective host system functionality.

Turning to the illustrated communication in more detail, the WPAN device 210 may transmit and/or receive messages via a wireless link 242 (which may correspond to wireless connection 109 in FIG. 1 where the wireless communication device 250 corresponds to the access point 125) with the wireless communication device 250. The WPAN device 210 may also transmit and/or receive messages via a wireless link 244 (which may correspond to wireless connection 111 in FIG. 1 where the wireless communication device 260 corresponds to the access point 135) with the wireless communication device 260. The messages may include information related to various types of communication (e.g., voice, data, multimedia services, associated control signaling, etc.). In general, the wireless communication device 250 may operate via the wireless link 242 in accordance with a first (primary) RAT and be accordingly referred to herein as a primary-RAT wireless communication device with associated primary-RAT components. The wireless communication device 260 may operate via the wireless link 244 in accordance with a second (secondary) RAT and be referred to herein as a secondary-RAT wireless communication device with associated secondary-RAT components. The wireless links 242 and 244 may operate over a common communication medium of interest, shown by way of example in FIG. 2 as the medium 240, which may be shared with still other communication systems and signaling schemes. A medium of this type may be composed of one or more frequency, time, and/or space communication resources (e.g., encompassing one or more channels across one or more carriers) associated with communication between one or more transmitter/receiver pairs.

As a particular example, the medium 240 may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by WLAN technologies, most notably IEEE 802.11x WLAN technologies generally referred to as "Wi-Fi." Example systems of this type include different variants of Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, and so on.

In the example of FIG. 2, the communication device 212 of the WPAN device 210 includes a first antenna 220, a second antenna 222, a primary-RAT transceiver 224 configured to operate in accordance with the primary RAT of the primary-RAT wireless communication device 250, and a co-located secondary-RAT transceiver 226 configured to operate in accordance with the secondary RAT of the secondary-RAT wireless communication device 260. As an example, the primary-RAT transceiver 224 may operate in accordance with Wi-Fi technology and the secondary-RAT transceiver 226 may operate in accordance with Bluetooth® technology. In an aspect, the primary-RAT transceiver 224 may utilize one or the other of the first antenna 220 and the second antenna 222, and the secondary-RAT transceiver 226 may utilize the other of the first antenna 220 and the second antenna 222. Alternatively, or additionally, the primary-RAT transceiver 224 may at times utilize both the first and second antennas 220 and 222, and at other times, the secondary-RAT transceiver 226 may utilize both the first and second antennas 220 and 222. In an aspect, there may be more than two antennas 220 and 222, such that at least one of the primary-RAT transceiver 224 and the secondary-RAT transceiver 226 may utilize multiple antennas while the other of the primary-RAT transceiver 224 and the secondary-RAT transceiver 226 may utilize one or more antennas.

As used herein, a "transceiver" may include one or more transmitter circuits, one or more receiver circuits, or a combination thereof, but need not provide both transmit and receive functionalities in all designs. Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

As will be discussed in more detail below, the communication controller 214 of the WPAN device 210 may include a scanning controller 228, which may operate in conjunction with the primary-RAT transceiver 224 and/or the secondary-RAT transceiver 226 to manage operations on the medium 240.

Figure 3:
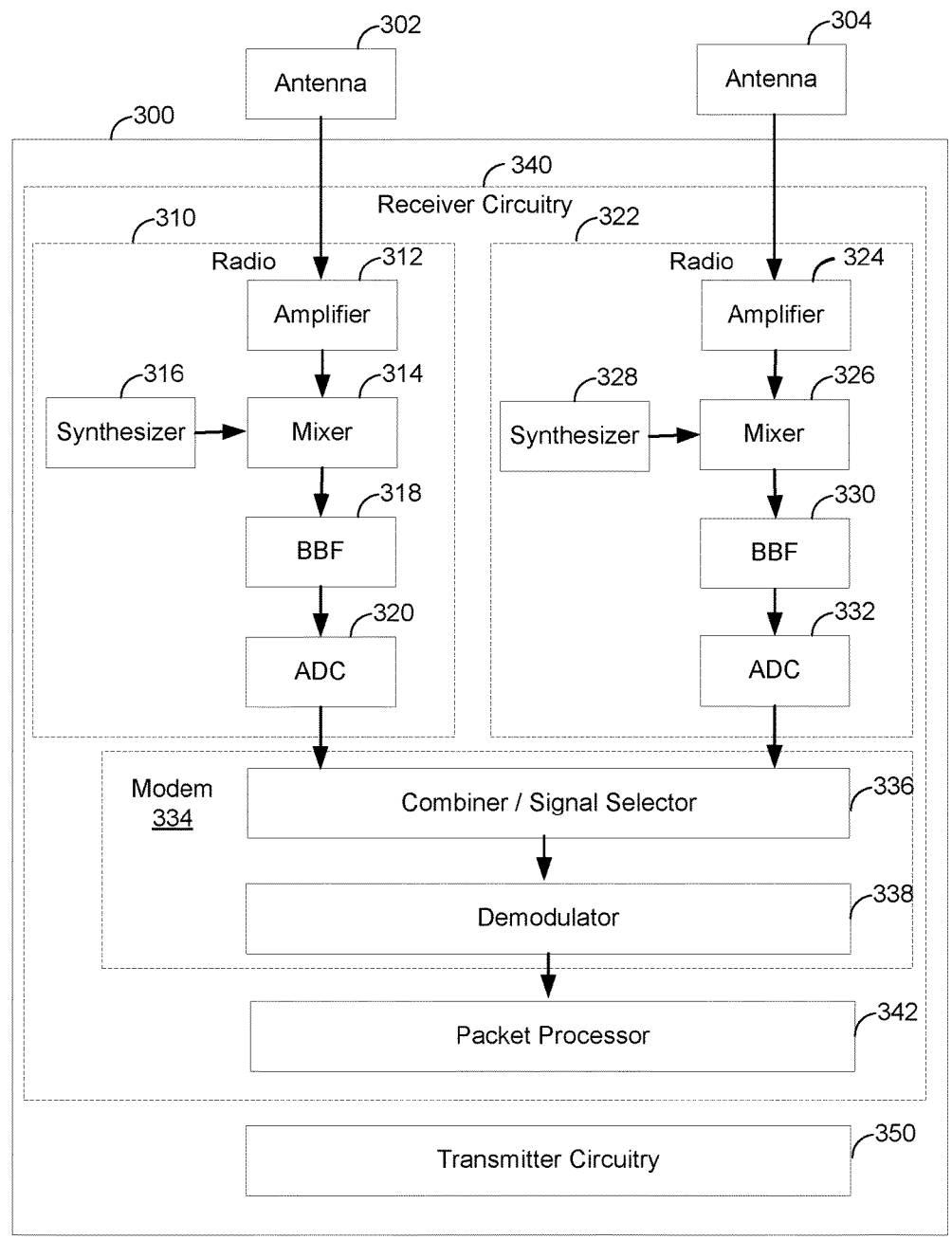
FIG. 3 illustrates an exemplary architecture of a transceiver implementing receiver diversity according to at least one aspect of the disclosure.

FIG. 3 illustrates an exemplary architecture of a transceiver 300 implementing receiver diversity according to at least one aspect of the disclosure. The transceiver 300 may be coupled to first and second antennas 302 and 304. The transceiver 300 may correspond to the primary-RAT transceiver 224 and/or the secondary-RAT transceiver 226 in FIG. 2, and the antennas 302 and 304 may correspond to the first and second antennas 220 and 222 in FIG. 2.

The transceiver 300 includes receiver circuitry 340 and transmitter circuitry 350. The receiver circuitry 340 is capable of implementing receiver diversity. As such, the receiver circuitry 340 includes two radios 310 and 322 coupled to the two antennas 302 and 304, respectively. Note that although FIG. 3 illustrates only two antennas 302 and 304 and two radios 310 and 322, as will be appreciated, there may be more than two antennas and two radios.

A transceiver (e.g., transceiver 300) generally includes a modem (e.g., modem 334) and a radio (e.g., radio 310 or 322). The radio, broadly speaking, handles selection and conversion of the radio frequency (RF) signals into the baseband or intermediate frequency and converts the RF signals to the digital domain. The modem is the remainder of the transceiver.

Referring to FIG. 3, radio 310 includes an amplifier 312, a mixer 314 (also referred to as a signal multiplier) for signal down conversion, a frequency synthesizer 316 (also referred to as an oscillator) that provides signals to the mixer 314, a baseband filter (BBF) 318, and an analog-to-digital converter (ADC) 320. Similarly, radio 322 includes an amplifier 324, a mixer 326, a frequency synthesizer 328, a BBF 330, and an ADC 332. The ADCs 320 and 332 are coupled to the signal combiner/signal selector 336 of the modem 334, which is coupled to the demodulator 338 of the modem 334. The demodulator 338 is coupled to a packet processor 342. The demodulator 338 and the packet processor 342 provide demodulated and processed single or multiple output signals to the communication controller (e.g., communication controller 214 in FIG. 2) and/or processing system (e.g., processing system 216 in FIG. 2).

Note that not every component illustrated in FIG. 3 is required for the operation of the system. For example, in direct RF to baseband conversion receivers, or any other direct conversion receivers, including certain Software Defined Radio (SDR) implementations, various components of the receiver circuitry 340 are not necessary, as is known in the art. In addition, while FIG. 3 illustrates a single modem 334 coupled to two radios 310 and 322, as will be appreciated, each radio 310 and 322 may be coupled to a different modem, and the receiver circuitry 340 would therefore include the same number of radios and modems.

As noted above, receive diversity is a technique to reduce fading and co-channel interference, and therefore to increase the receiving device's sensitivity to wireless signals. Thus, to enable WPAN devices (e.g., WPAN devices 110 to 118 in FIG. 1) to communicate over longer ranges, WPAN devices can use receive diversity methods to increase sensitivity to received wireless signals. As discussed above with reference to FIG. 3, a diversity receiver contains two or more antennas and radios and at least partially duplicated modems (e.g., a single demodulator). When not used to increase sensitivity to wireless signals of a particular RAT, the additional antennas and radios could be used for concurrent operations, such as simultaneous channel scan operations for different RATs.

Channel scans can take a significant amount of time if a device has only one shared receiver, especially in multimode configurations (e.g., where the device is communicating over multiple RATs, such as WiFi, Bluetooth®, 15.4, etc.). For example, the shared receiver may need to perform channel assessment (interference) scans, Bluetooth® Classic identifier (ID) packet scans, BLE and BLR Advertisement scans, 15.4 scans, etc. These different types of scans are referred to as concurrent operations because they need to occur concurrently when the device is communicating over multiple RATs.

Faster channel scanning would allow more time for shared radio operations and/or shorter connection setup times. Accordingly, the present disclosure provides a scan control algorithm to determine how the multiple antennas and radios of a WPAN device should be utilized for channel scanning operations. The scan control algorithm may be implemented in the scanning controller 228 in FIG. 2.

The inputs to the scan control algorithm include the number of available antennas and radios of the WPAN device and the number of concurrently scheduled scans for the different RATs and their relative priorities. For example, scans such as Bluetooth® page scans, Bluetooth® inquiry scans, BLE/BLR advertisement scans, 15.4 scans, channel assessment scans, and the like have different priorities of when and in what order they should be performed. These priorities may be predetermined at design time and may depend on product (device) requirements, as different devices may put different emphasis on the relative priorities as they may be used for different purposes.

The output of the scan control algorithm is the antenna and corresponding radio assignment for a scheduled scan (e.g., Bluetooth® page scan, Bluetooth® inquiry scan, BLE/BLR advertisement scan, etc.). If only one type of channel scan is scheduled for the current time, the WPAN device can assign different operations of the scan to different antennas and radios. This is referred to as an "accelerated scan" because by using multiple antennas and radios to perform a single scan, the scan will be performed faster. Alternatively, if more than one scan type is scheduled to be performed at the present time, the WPAN device can assign different ones of the concurrently scheduled scan types to different antennas and corresponding radios. This is referred to as a "concurrent scan."

For example, if only a Bluetooth® ID packet scan (e.g., a page scan or an inquiry scan) is scheduled for the present time, the WPAN device can assign train 1 of the Bluetooth® ID packet scan to a first antenna and corresponding radio (e.g., antenna 302 and radio 310) and train 2 of the Bluetooth® ID packet scan to another antenna and corresponding radio (e.g., antenna 304 and radio 322). As noted above with reference to FIG. 3, not every component illustrated in FIG. 3 is required for the operation of the system. However, for the exemplary accelerated scan, the WPAN device should be equipped with at least two antennas and corresponding radios that each includes a corresponding synthesizer.

As another example, the WPAN device can perform a bad channel assessment concurrently with other radio operations. In this scenario, the WPAN device can use one antenna and corresponding radio (e.g., antenna 302 and radio 310) for bad channel assessment and another antenna and corresponding radio (e.g., antenna 304 and radio 322) for other WPAN operations. Like the previous example, although not every component illustrated in FIG. 3 is required for the operation of the system, for the example concurrent scan, the WPAN device should be equipped with at least two antennas and corresponding radios that each includes a corresponding synthesizer.

As yet another example, the WPAN device can accelerate multi-mode scanning. In this scenario, the WPAN device can use different antennas and corresponding radios to perform concurrent channel scans on different RATs (e.g., Bluetooth® Classic, BLE, BLR, 15.4, and/or the like). Like the previous examples, although not every component illustrated in FIG. 3 is required for the operation of the system, for the example concurrent scans, the WPAN device should be equipped with at least two antennas and corresponding radios that each includes a corresponding synthesizer.

Figure 4:
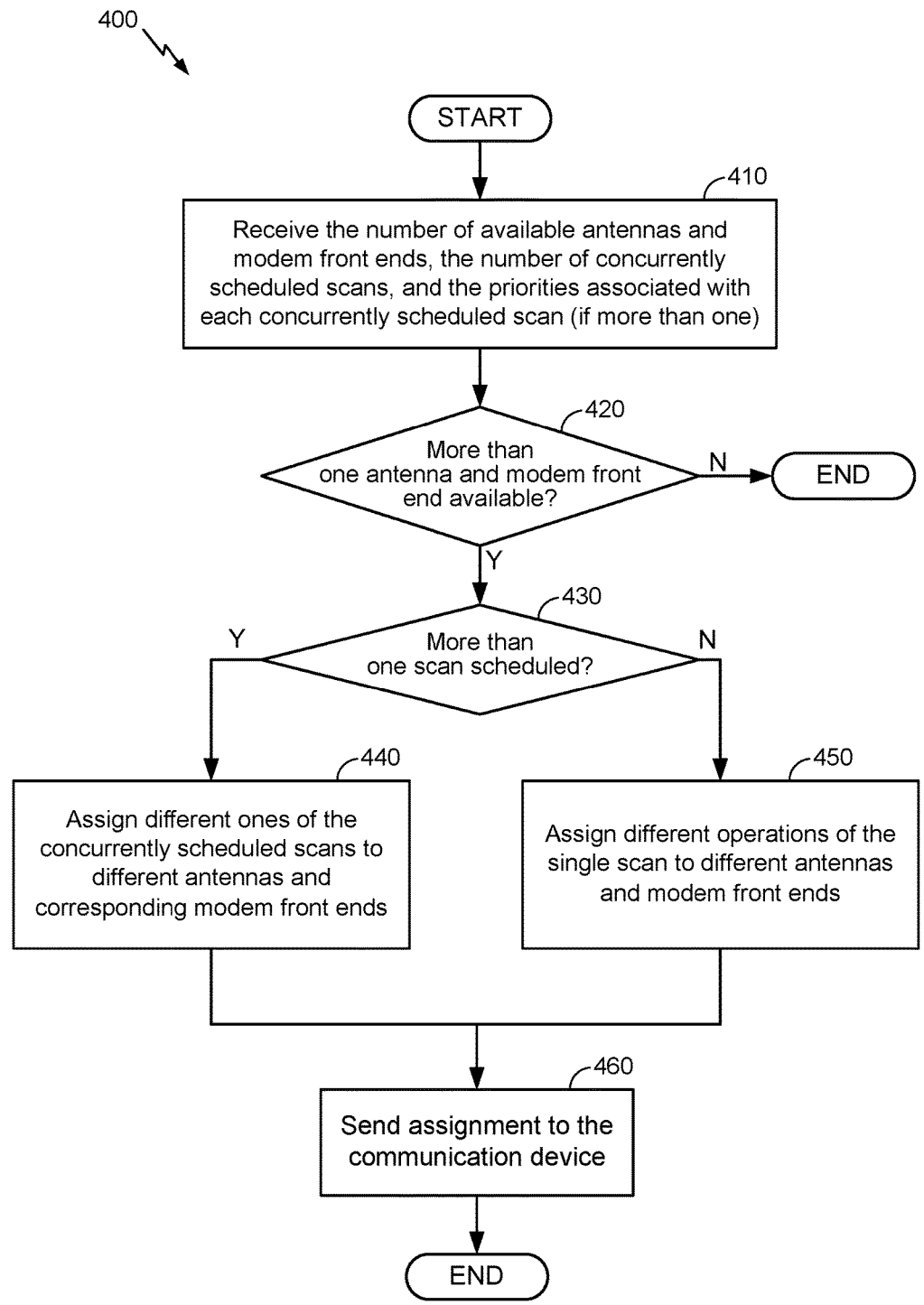
FIG. 4 illustrates an exemplary scan control method according to at least one aspect of the disclosure.

FIG. 4 illustrates an exemplary scan control method 400 according to at least one aspect of the disclosure. The scan control method 400 may be performed by the scanning controller 228 of the WPAN device 210, where the scanning controller 228 includes processing circuitry, or by the communication controller 214 executing the scanning controller 228, where the scanning controller 228 is a software module. For simplicity, the scan control method 400 will be described as being performed by the scanning controller 228. The scan control method 400 may be performed periodically or in response to an event, such as the scheduling of a new channel scan.

At 410, execution of the scan control method 400 causes the scanning controller 228 to receive the number of available antennas and corresponding radios of the WPAN device 210, the number of scans scheduled for the current time (referred to as concurrently scheduled scans), and the relative priorities of each concurrently scheduled scan (if more than one). Note that not all antennas and corresponding radios of the WPAN device 210 may be available at all times. For example, if the WPAN device 210 has two antennas and corresponding radios (as illustrated in FIG. 3) and one of those antennas and corresponding radios is currently being used (e.g., for a previously scheduled channel scan), then there would only be one available antenna and corresponding radio identified at 410.

At 420, execution of the scan control method 400 causes the scanning controller 228 to determine whether or not there is more than one available antenna and corresponding radio available. If there is not, the scan control method 400 ends. At 430, if there is more than one available antenna and corresponding modem radio available, execution of the scan control method 400 causes the scanning controller 228 to determine whether or not more than one scan is scheduled for the present time.

At 440, if more than one scan is scheduled to be performed at the current time, execution of the scan control method 400 causes the scanning controller 228 to perform a concurrent scan, that is, to assign different ones of the concurrently scheduled scans to different available antennas and corresponding radios of the WPAN device 210 based on the relative priorities of the concurrently scheduled scans. Where there are more concurrently scheduled scans than available antennas and corresponding radios, the execution of the scan control method 400 causes the scanning controller 228 to assign higher priority scans to available antennas and corresponding radios before assigning lower priority scans.

At 450, if only one channel scan is scheduled for the current time, execution of the scan control method 400 causes the scanning controller 228 to perform an accelerated scan, that is, to assign different operations of the single scan to different available antennas and radios of the WPAN device 210. For example, the different operations may be a channel scan on two or more frequencies simultaneously.

At 460, execution of the scan control method 400 causes the scanning controller 228 to send the assignment of the available antennas and radios to the communication device 212. The communication device 212 can then assign the concurrently scheduled scans or the different operations of the single scan to the available antennas and radios.

Figure 5:
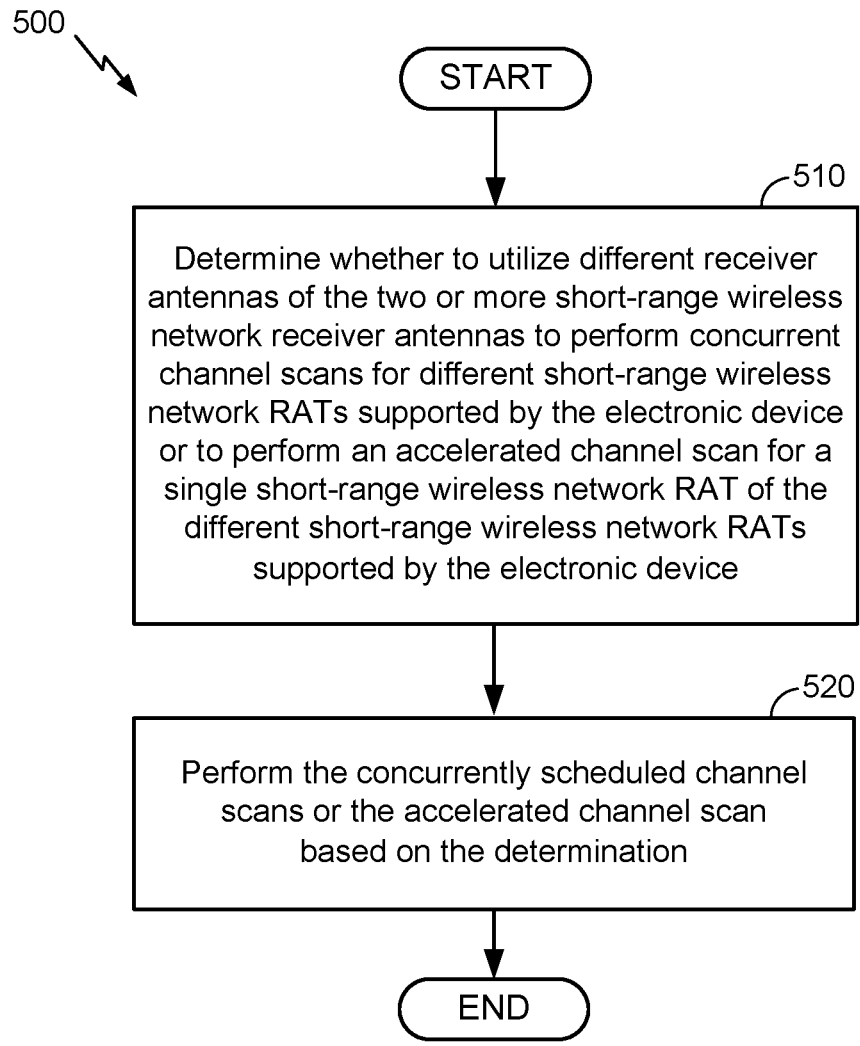
FIG. 5 illustrates an exemplary method for improving the performance of short-range wireless network channel scans using receiver diversity.

FIG. 5 illustrates an exemplary method 500 for improving the performance of short-range wireless network channel scans using receiver diversity. The method 500 may be performed by the scanning controller 228 of the WPAN device 210, where the scanning controller 228 includes processing circuitry, or by the communication controller 214 executing the scanning controller 228, where the scanning controller 228 is a software module. For simplicity, the method 500 will be described as being performed by the scanning controller 228. The method 500 may be performed periodically or in response to an event, such as the scheduling of a new channel scan.

At 510, the scanning controller 228 determines whether to utilize different receiver antennas (e.g., first and second antennas 220 and 222 in FIG. 2 and/or antennas 302 and 304) of two or more available short-range wireless network receiver antennas to perform concurrent channel scans for different short-range wireless network RATs (e.g., Bluetooth® Classic, BLE, BLR, etc.) supported by the WPAN device 210, or to perform an accelerated channel scan for a single short-range wireless network RAT of the different short-range wireless network RATs supported by the WPAN device 210, as discussed above with reference to operations 420 to 450 of FIG. 4.

At 520, the scanning controller 228 performs the concurrently scheduled channel scans or the accelerated channel scan based on the determination, as discussed above with reference to operation 460 of FIG. 4 and elsewhere.

Figure 6:
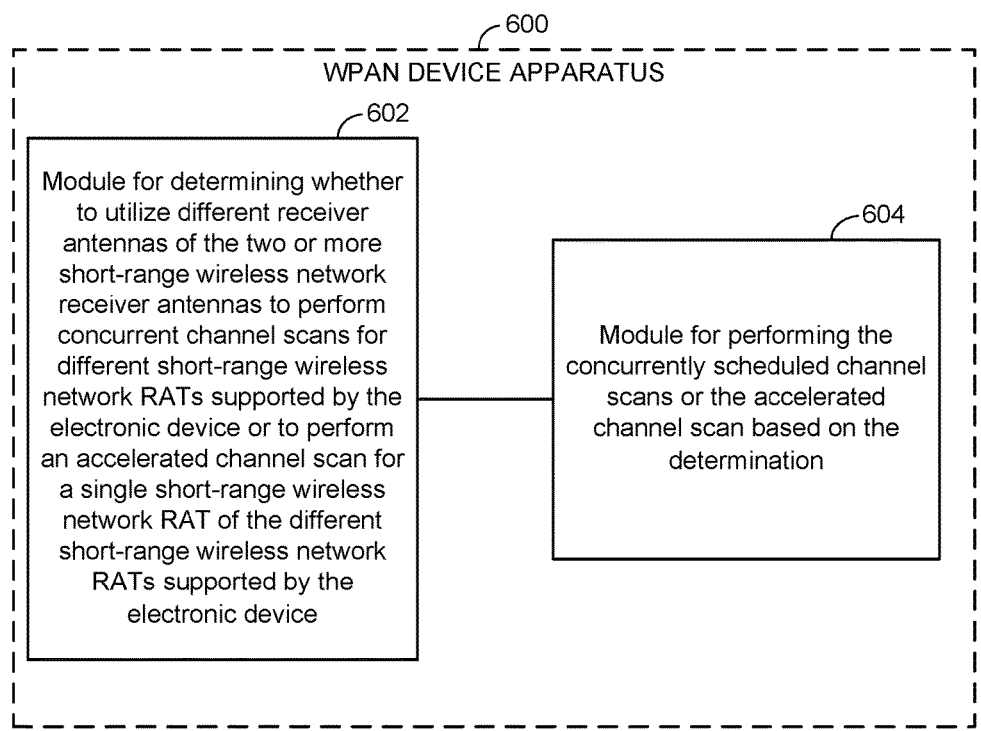
FIG. 6 is a simplified block diagram of several sample aspects of an apparatus configured to support communications as taught herein.

FIG. 6 illustrates an example WPAN device apparatus 600 represented as a series of interrelated functional modules. A module for determining 602 may correspond at least in some aspects to, for example, a communication controller, such as communication controller 214 in FIG. 2, as discussed herein. A module for performing 604 may correspond at least in some aspects to, for example, a communication device, such as communication device 212 in FIG. 2, as discussed herein.

The functionality of the modules of FIG. 6 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 6, as well as other components and functions described herein, may be implemented using any suitable means. Such means also may be implemented, at least in part, using corresponding structure as taught herein. For example, the components described above in conjunction with the "module for" components of FIG. 6 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for improving the performance of short-range wireless network channel scans using receiver diversity.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for improving performance of short-range wireless network channel scans using receiver diversity, comprising:
   determining, by an electronic device having two or more short-range wireless network receiver antennas, whether to utilize different receiver antennas of the two or more short-range wireless network receiver antennas to perform concurrently scheduled channel scans for different short-range wireless network radio access technologies (RATs) supported by the electronic device, or to perform an accelerated channel scan for a single short-range wireless network RAT of the different short-range wireless network RATs supported by the electronic device; and
   performing, by the electronic device, the concurrently scheduled channel scans or the accelerated channel scan based on the determination.

2. The method of claim 1, wherein the concurrently scheduled channel scans comprise: channel scans for two or more RATs of the different short-range wireless network RATs that have been scheduled to be performed concurrently.

3. The method of claim 1, wherein performing the accelerated channel scan comprises: performing a channel scan for the single short-range wireless network RAT on two or more frequencies simultaneously.

4. The method of claim 1, wherein the determination is based on priorities of the concurrently scheduled channel scans, and wherein the electronic device performs higher priority channel scans of the concurrently scheduled channel scans before performing lower priority channel scans of the concurrently scheduled channel scans.

5. The method of claim 4, wherein the electronic device performs two or more of the higher priority channel scans simultaneously utilizing the two or more short-range wireless network receiver antennas, and wherein the electronic device performs one or more of the lower priority channel scans simultaneously utilizing at least one of the two or more short-range wireless network receiver antennas.

6. The method of claim 1, wherein the electronic device performs the accelerated channel scan if there are no concurrently scheduled channel scans for the different short-range wireless network RATs.

7. The method of claim 1, further comprising:
   receiving an indication that the two or more short-range wireless network receiver antennas are available to perform concurrently scheduled channel scans.

8. The method of claim 7, wherein the two or more short-range wireless network receiver antennas are available to perform concurrently scheduled channel scans based on the two or more short-range wireless network receiver antennas not currently performing channel scans.

9. The method of claim 1, wherein each of the two or more short-range wireless network receiver antennas is coupled to a different radio.

10. The method of claim 9, wherein each of the different radios is coupled to the same modem.

11. The method of claim 9, wherein each of the different radios is coupled to a different modem.

12. The method of claim 1, wherein each of the two or more short-range wireless network receiver antennas is coupled to a different synthesizer.

13. The method of claim 1, wherein the different short-range wireless network RATs comprise: Bluetooth® Low Energy (BLE), Bluetooth® Long Range (BLR), Bluetooth® Classic, ZigBee®, Wireless Universal Serial Bus (USB), Z-Wave®, IEEE 802.15.4, Long-Term Evolution Direct (LTE-D), or any combination thereof.

14. The method of claim 1, wherein the electronic device comprises: a wireless personal area network (WPAN) device.

15. An apparatus for improving performance of short-range wireless network channel scans using receiver diversity, comprising:
two or more short-range wireless network receiver antennas; and
a communication controller coupled to the two or more short-range wireless network receiver antennas, the communication controller configured to:
determine whether to utilize different receiver antennas of the two or more short-range wireless network receiver antennas to perform concurrently scheduled channel scans for different short-range wireless network radio access technologies (RATs) supported by the apparatus, or to perform an accelerated channel scan for a single short-range wireless network RAT of the different short-range wireless network RATs supported by the apparatus; and
cause a communication device of the apparatus to perform the concurrently scheduled channel scans or the accelerated channel scan based on the determination.

16. The apparatus of claim 15, wherein the concurrently scheduled channel scans comprise: channel scans for two or more RATs of the different short-range wireless network RATs that have been scheduled to be performed concurrently.

17. The apparatus of claim 15, wherein the communication controller being configured to cause the communication device to perform the accelerated channel scan comprises: the communication controller being configured to cause the communication device to perform a channel scan for the single short-range wireless network RAT on two or more frequencies simultaneously.

18. The apparatus of claim 15, wherein the determination is based on priorities of the concurrently scheduled channel scans, and wherein the communication controller is configured to cause the communication device to perform higher priority channel scans of the concurrently scheduled channel scans before performing lower priority channel scans of the concurrently scheduled channel scans.

19. The apparatus of claim 18, wherein the communication device performs two or more of the higher priority channel scans simultaneously utilizing the two or more short-range wireless network receiver antennas, and wherein the communication device performs one or more of the lower priority channel scans simultaneously utilizing at least one of the two or more short-range wireless network receiver antennas.

20. The apparatus of claim 15, wherein the communication controller is configured to cause the communication device to perform the accelerated channel scan if there are no concurrently scheduled channel scans for the different short-range wireless network RATs.

21. The apparatus of claim 15, wherein the communication controller is further configured to receive an indication that the two or more short-range wireless network receiver antennas are available to perform concurrently scheduled channel scans.

22. The apparatus of claim 21, wherein the two or more short-range wireless network receiver antennas are available to perform concurrently scheduled channel scans based on the two or more short-range wireless network receiver antennas not currently performing channel scans.

23. The apparatus of claim 15, wherein each of the two or more short-range wireless network receiver antennas is coupled to a different radio.

24. The apparatus of claim 23, wherein each of the different radios is coupled to the same modem.

25. The apparatus of claim 23, wherein each of the different radios is coupled to a different modem.

26. The apparatus of claim 15, wherein each of the two or more short-range wireless network receiver antennas is coupled to a different synthesizer.

27. The apparatus of claim 15, wherein the different short-range wireless network RATs comprise: Bluetooth® Low Energy (BLE), Bluetooth® Long Range (BLR), Bluetooth® Classic, ZigBee, Wireless Universal Serial Bus (USB), Z-Wave®, IEEE 802.15.4, Long-Term Evolution Direct (LTE-D), or any combination thereof.

28. The apparatus of claim 15, wherein the apparatus comprises: a wireless personal area network (WPAN) device.

29. An apparatus for improving performance of short-range wireless network channel scans using receiver diversity, comprising:
two or more short-range wireless network receiver antennas;
means for determining whether to utilize different receiver antennas of the two or more short-range wireless network receiver antennas to perform concurrently scheduled channel scans for different short-range wireless network radio access technologies (RATs) supported by the apparatus, or to perform an accelerated channel scan for a single short-range wireless network RAT of the different short-range wireless network RATs supported by the apparatus; and
means for performing the concurrently scheduled channel scans or the accelerated channel scan based on the determination.

30. A non-transitory computer-readable medium storing computer-executable instructions for improving performance of short-range wireless network channel scans using receiver diversity, the computer-executable instructions comprising:
at least one instruction instructing an electronic device having two or more short-range wireless network receiver antennas to determine whether to utilize different receiver antennas of the two or more short-range wireless network receiver antennas to perform concurrently scheduled channel scans for different short-range wireless network radio access technologies (RATs) supported by the electronic device, or to perform an accelerated channel scan for a single short-range wireless network RAT of the different short-range wireless network RATs supported by the electronic device; and at least one instruction instructing the electronic device to perform the concurrently scheduled channel scans or the accelerated channel scan based on the determination.

\* \* \* \* \*